E. J. MARSTERS.
Car-Truck.

No. 220,928. Patented Oct. 28, 1879.

Witnesses
William W. Osborn
Edward J. Osborn

Inventor
Enoch J. Marsters
By C. W. M. Smith
his Atty.

N. PETERS, PHOTO-LITHOGRAPHER, WASHINGTON, D. C.

UNITED STATES PATENT OFFICE.

ENOCH J. MARSTERS, OF STOCKTON, CALIFORNIA.

IMPROVEMENT IN CAR-TRUCKS.

Specification forming part of Letters Patent No. 220,928, dated October 28, 1879; application filed May 3, 1879.

*To all whom it may concern:*

Be it known that I, ENOCH J. MARSTERS, of Stockton, in the county of San Joaquin and State of California, have made and invented a certain new and useful Improvement in Car-Trucks, which invention is fully set forth and described in the following specification and the accompanying drawings.

The objects of this my invention in car-trucks are to reduce the friction, to equalize the weight upon the axles of the trucks, and to produce a radial shifting of the wheels and axles in running upon curves, and the novel means whereby this is all accomplished are herein fully described.

They consist, first, in the novel construction of a connecting frame or bar and its combination with the truck and the car-axle boxes in the pedestals, whereby the opposite boxes carrying the same axle are connected positively and caused to move simultaneously, for the purpose of throwing the axle into and out of diagonal or radial position at the required times; second, in the novel construction and application of equalizing-bars to and beneath the car-truck, by which the entire weight of the load on the truck is equally distributed upon the axles and is sustained upon and by the said bars and the parts connected therewith.

Figure 1:
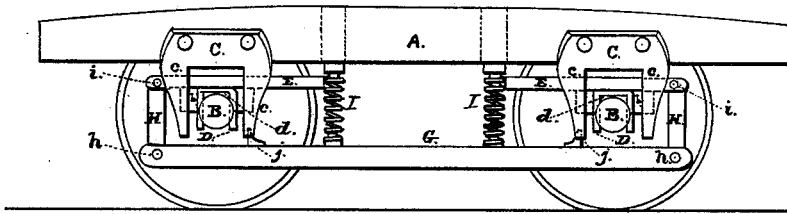
Figure 2:
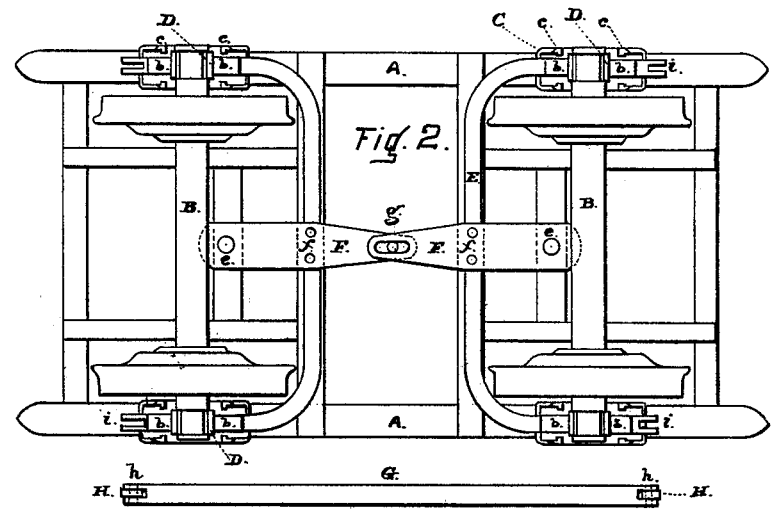
Figure 4:
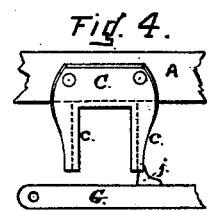
Figure 3:
Figure 3:
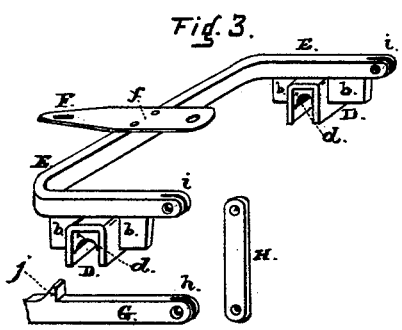
Figure 5:
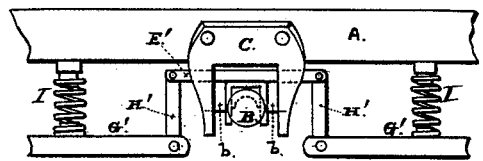

In the accompanying drawings, Figure 1 is a side elevation of my improved car-truck. Fig. 2 is a plan view of the under side of Fig. 1. Fig. 3 is a detail view of the car-axle box, the connecting-bar, and the equalizing-bar. Fig. 4 shows the pedestal in detail. Fig. 5 shows the arrangement of these parts as applied to the center axle in the construction of a six-wheel truck.

A represents the truck-frame, and B the axles. C C are the pedestals, which I make of greater width and with more space between the jaws $c\,c$ than in those now in use. D D are the car-axle boxes, which hold the oil-boxes $d\,d$ and receive the ends of the axles B. On each side of these axle-boxes are longitudinal ribs $b\,b$, that are caused to play in slots $b'$, formed in and through the edges of the vertical jaws $c$.

E is a bent bar or frame extending from one pedestal around to the other on the opposite side of the truck, and partly embracing between its ends the axle and its wheels. Two of such frames are shown as employed in a truck of this description, and they are connected together in the center of the truck-frame, both to each other and to the truck-frame, by pivoted oscillating levers or reaches F F.

The reaches F are pivoted at $e$ to the truck-frame, and are secured to the bent bar or frame at $f$, and a pin and slot, $g$, connect their two free ends together, so that they constitute a means for producing a positive movement of the two frames E E simultaneously together.

The pedestals C have sufficient space between the jaws to allow of the required side-play in shifting the axles into and out of their radial positions, and these changes are effected by the action of the rails as the flanges of the wheels in running strike upon the curves, or as they leave the curves and run upon the straight rails again.

By this construction each set of wheels and their axle is held and controlled by a bent bar or frame, E, and the shifting of one axle to or from a radial position will produce a simultaneous change or shifting of the other axle into a contrary position, so that the axles shall both take diagonal positions which are radii of the curve of the track.

When the wheels run from the curve to the straight portion of the track again, the bent frames and their reaches operate to shift the axles to their normal positions, perpendicular to the longitudinal axis of the truck.

The weight of the truck-frame and the load sustained by it is received upon horizontal equalizing-bars G G, beneath the truck, one at each side of the frame, and is by them equally distributed and thrown upon the boxes D, and thus upon the axles. The ends $h\,h$ of the equalizing-bars extend a little beyond the outer ends of the pedestals, and a link, H, pivoted to each end, serves to connect them with the ends $i$ of the bent bars or frames E. By these means the load received by the bars G G is thrown upon the bent bars E at the sides of the truck, and thus distributed to the axle-boxes D beneath these bars.

The pivoted links H permit the axle-boxes and frames E to have the required shifting movements in the pedestals.

Between the truck-frame A and the top of the equalizing-bars G are interposed springs I I, to receive the direct weight of the load and distribute it upon the bars. This causes the truck to ride lightly and overcomes or takes up the vertical play of the axle-boxes in their pedestals.

The bars G have small guiding-ribs j j, that take into the vertical slots b' at one side of the pedestals, for the purpose of preventing any swinging or side play of the bars and keeping them to their vertical movements. The lower ends of the jaws c c of the pedestals can be also extended for this purpose to embrace the bars G. The longitudinal bars G have thus no endwise movement; but the links, being pivoted thereto, allow the connecting-bars or bent frames E to play back and forth. The weight being taken directly upon the bars G, the boxes, with their axles, are free to shift with a small degree of friction within their pedestals.

The ribs or extensions b b on the sides of the boxes D keep them in place, while they allow a free shifting of the axles to and from a right line; and in order to overcome the friction as much as possible, the slots in the pedestals can be made on a curve to conform to the swing of the axles.

In applying my invention to a six-wheel truck, the center axle will be supported in the same way in a box and a slotted pedestal, as shown in Fig. 5 of the drawings, and the equalizing-bars will then consist each of two parts, G' G', connected by links H' H' to a straight connecting-bar, E', which rides upon and is secured to the car-axle box D. This axle, it will be seen, has no lateral movement, but only a vertical motion in its pedestals.

As thus constructed, my invention constitutes an improved anti-friction car-truck, in which the axles have the capacity to adapt themselves radially to the curve of the track, and which is also applicable to four or six wheel trucks.

Having thus fully described my invention, what I claim, and desire to secure by Letters Patent, is—

1. In a car-truck, the horizontal equalizing-bars G G at each side of the truck-frame, with springs I I and connecting-links H H, that connect said bars to the bars E and the car-axle boxes, by which the weight and load upon the truck are suspended equally from the axles, substantially as described and specified.

2. In combination with the bars G G, having springs I I and links H H, that connect them with the frame E and axle-boxes D, the guiding-ribs j j, substantially as described, for the purpose set forth.

3. In combination with the bent pivoted frame or bar E, the car-axle boxes D, having ribs b b, all connected rigidly to the said frame or bar E, substantially as described, for the purpose set forth.

4. The improved car-truck constructed, substantially as herein described, of the frame A, pedestals C, with longitudinal slots b', car-axle boxes D, with ribs b, connecting frames or bars E E, to which the said boxes are rigidly secured, pivoted reaches F F, horizontal equalizing-bars G G, springs I I, and links H H, all combined and arranged for the purpose set forth.

In testimony that I claim the foregoing I have hereunto set my hand this 22d day of March, 1879.

ENOCH J. MARSTERS.

Witnesses:
JNO. TULLY,
JNO. H. WEBSTER.